United States Patent
Moles et al.

(10) Patent No.: US 7,024,187 B2
(45) Date of Patent: Apr. 4, 2006

(54) SYSTEM AND METHOD FOR PERFORMING DIAGNOSTICS ON A MOBILE STATION USING OVER-THE-AIR TRANSFER OF INTERPRETED BYTE-CODE PROGRAM

(75) Inventors: Bryan J. Moles, Dallas, TX (US); Sudhindra P. Herle, Plano, TX (US); Ronald J. Webb, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 772 days.

(21) Appl. No.: 09/733,662

(22) Filed: Dec. 8, 2000

(65) Prior Publication Data
US 2002/0072359 A1  Jun. 13, 2002

(51) Int. Cl.
*H04Q 7/20* (2006.01)
(52) U.S. Cl. ............. 455/423; 455/418; 455/67.11
(58) Field of Classification Search .......... 455/425, 455/418, 419, 423, 67.1, 457, 67.11, 67.14; 701/29, 32, 34, 35
See application file for complete search history.

(56) References Cited

U.S. PATENT DOCUMENTS

| | | | |
|---|---|---|---|
| 5,249,305 A * | 9/1993 | Wieczorek et al. | 455/517 |
| 5,442,553 A * | 8/1995 | Parrillo | 455/420 |
| 5,706,333 A * | 1/1998 | Grenning et al. | 455/423 |
| 6,262,659 B1 * | 7/2001 | Korkosz et al. | 340/539.24 |
| 6,333,973 B1 * | 12/2001 | Smith et al. | 379/88.12 |
| 6,757,521 B1 * | 6/2004 | Ying | 455/67.11 |
| 2001/0049263 A1 * | 12/2001 | Zhang | 455/67.1 |
| 2002/0070753 A1 * | 6/2002 | Vogel et al. | 326/37 |
| 2002/0100018 A1 * | 7/2002 | Click et al. | 717/124 |

* cited by examiner

Primary Examiner—Danh C. Le

(57) ABSTRACT

There is disclosed a mobile station diagnostic testing system for use in a wireless network comprising a plurality of base stations capable of communicating with a plurality of mobile stations. The mobile station diagnostic testing system tests the operation of a first mobile station. The mobile station diagnostic testing system comprises: 1) a database for storing a mobile station diagnostic testing file comprising a mobile station diagnostic testing program in interpreted byte-code format; and 2) a diagnostics controller coupled to the database for receiving a notification indicating that a fault has occurred in the first mobile station. In response to receipt of the notification, the mobile diagnostics testing system retrieves the mobile station diagnostic testing file from the database and transmits it to the first mobile station. Receipt of the mobile station diagnostic testing file causes the mobile station to execute the mobile station diagnostic testing program.

23 Claims, 5 Drawing Sheets

SYSTEM AND METHOD FOR PERFORMING
DIAGNOSTICS ON A MOBILE STATION
USING OVER-THE-AIR TRANSFER OF
INTERPRETED BYTE-CODE PROGRAM

CROSS-REFERENCE TO RELATED
APPLICATIONS

The present invention is related to those disclosed in the following U.S. patent applications:

1. Ser. No. 09/500,499, filed Feb. 9, 2000, entitled "SYSTEM AND METHOD FOR SECURE OVER-THE-AIR PROVISIONING OF A MOBILE STATION FROM A PROVISIONING SERVER VIA A TRAFFIC CHANNEL;"

2. Ser. No. 09/501,468, filed Feb. 9, 2000, entitled "SYSTEM AND METHOD FOR SECURE PROVISIONING OF A MOBILE STATION FROM A PROVISIONING SERVER USING IWF-BASED IP ADDRESS TRANSLATION;"

3. Ser. No. 09/475,602, filed on Dec. 30, 1999, entitled "SYSTEM AND METHOD FOR SECURE PROVISIONING OF A MOBILE STATION FROM A PROVISIONING SERVER USING IP ADDRESS TRANSLATION AT THE BTS/BSC;"

4. Ser. No. 09/475,760, filed on Dec. 30, 1999, entitled "SYSTEM AND METHOD FOR SECURE PROVISIONING OF A MOBILE STATION FROM A PROVISIONING SERVER USING E NCRYPTION;" and 5. Ser. No. 09/542,632, filed on Apr. 4, 2000, entitled "SYSTEM AND METHOD FOR PROVISIONING OR UPDATING A MOBILE STATION USING OVER-THE-AIR TRANSFER OF INTERPRETED BYTE-CODE PROGRAM."

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless networks and, more specifically, to a system for performing over-the-air (OTA) diagnostic operations on cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited.

However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

When a subscriber finds some fault in the operation of his or her wireless handset, identifying and correcting the fault usually requires taking the handset to a nearby service center where a technician loads a custom diagnostic software program into the handset to pinpoint the fault. Often, the fault does not lie in the hardware. Detecting this is costly and time consuming for the subscriber, the service provider and/or the handset vendor.

In 3G systems, the increased bandwidth for data applications makes many new and innovative services possible. One such service is a mechanism for doing handset diagnostics remotely by downloading a short diagnostic program using Internet protocol (IP) based transport. A diagnostic operation may be executed by:

a) downloading a special diagnostic application program written specifically for the handset used by the subscriber and, after the diagnostic program has completed, reinstalling the original handset software. The special diagnostic program must be written specifically for each model of the handset, since hardware addresses and the like may change from handset to handset. The special diagnostic program may be downloaded by a serial connection of over-the-air (OTA); and b) maintaining a permanent copy of the diagnostic program in non-volatile memory in each handset.

Unfortunately, these methods have several drawbacks. It is costly to have a subscriber bring a handset into the service center for simple diagnostic testing and repairs. It also is expensive for the handset manufacturer to develop separate diagnostic programs for each model of a handset. It is not cost-effective to integrate the diagnostic program into the regular software of the handset, since it takes up additional space and is seldom used. This amounts to optimizing a design for failure. Additionally, it is cumbersome for the service center or the wireless service provider to maintain separate diagnostic programs for every brand and model of handsets. Furthermore, if the diagnostic program over-writes or inadvertently corrupts the existing handset software, it may be impossible for the handset to become operational again without taking it back to the service center for re-programming.

Therefore, there is a need in the art for improved systems and methods for performing diagnostic operations on wireless handsets and other types of mobile stations. In particular, there is a need in the art for systems and methods for performing over-the-air diagnostic testing of wireless handsets that minimizes subscriber interaction. More particularly, there is a need for systems and methods for performing over-the-air diagnostic testing of wireless handsets without using different diagnostic software in handsets from different manufacturers.

SUMMARY OF THE INVENTION

To address the above-discussed deficiencies of the prior art, it is a primary object of the present invention to provide a mobile station diagnostic testing system for use in a wireless network comprising a plurality of base stations, each of the base stations capable of communicating with a plurality of mobile stations. The mobile station diagnostic testing system is capable of testing the operation of a first one of the plurality of mobile stations. According to an advantageous embodiment of the present invention, the mobile station diagnostic testing system comprises: 1) a database capable of storing a mobile station diagnostic testing file comprising a mobile station diagnostic testing program in interpreted byte-code format; and 2) a diagnostics controller coupled to the database capable of receiving a notification indicating that a fault has occurred in the first mobile station and further capable, in response to receipt of the notification, of retrieving the mobile station diagnostic testing file from the database and transmitting the mobile station diagnostic testing file to the first mobile station, wherein receipt of the mobile station diagnostic testing file causes the mobile station to execute the mobile station diagnostic testing program in the mobile station diagnostic testing file.

According to one embodiment of the present invention, the mobile station diagnostic testing file further comprises diagnostics data used to test the first mobile station.

According to another embodiment of the present invention, the mobile station diagnostic testing file is transmitted to the mobile station using TCP/IP packets.

According to still another embodiment of the present invention, the mobile station diagnostic testing file is transmitted to the mobile station using at least one short messaging service (SMS) message.

According to yet another embodiment of the present invention, the diagnostics controller is capable of determining from the notification a model type of the first mobile station and, in response to the determination, selecting the mobile station diagnostic testing program according to the model type.

It is a further object of the present invention to provide a mobile station capable of being tested from a wireless network by an over-the-air (OTA) mobile diagnostic testing process. In an advantageous embodiment of the present invention, the mobile station comprises: 1) an RF transceiver capable of receiving and demodulating forward channel messages from the wireless network and further capable of modulating and transmitting reverse channel messages to the wireless network; and 2) a main controller capable of receiving the demodulated forward channel messages from the RF transceiver and extracting therefrom a mobile station diagnostic testing file containing a mobile station diagnostic testing program in interpreted byte-code format, wherein the main controller, in response to receipt of the mobile station diagnostic testing file, is capable of interpreting and executing the mobile station diagnostic testing program.

In one embodiment of the present invention, the mobile station diagnostic testing file further comprises diagnostic testing data and wherein the main controller uses the diagnostic testing data to test the mobile station.

In another embodiment of the present invention, the mobile station diagnostic testing file is transmitted to the mobile station in the forward channel messages using TCP/IP packets.

In still another embodiment of the present invention, the mobile station diagnostic testing file is transmitted to the mobile station in the forward channel messages using at least one short messaging service (SMS) message.

In yet another embodiment of the present invention, the mobile station diagnostic testing program comprises a graphical user interface (GUI) program capable of interacting with a user of the mobile station during the OTA diagnostic testing process.

In a further embodiment of the present invention, the main controller is capable of transmitting to the wireless network a reverse channel notification message notifying the wireless network that a fault has been detected in the mobile station, wherein receipt of the reverse channel notification message is capable of causing the wireless network to transmit the mobile station diagnostic testing file to the mobile station.

In a still further embodiment of the present invention, the reverse channel notification message comprises an identifier identifying a model type of the mobile station.

The present invention proposes a mechanism whereby, a diagnostic application program is written once in an interpreted language (e.g., Java, Tcl, Perl, Lua) and compiled into bytecode. The bytecode is downloaded to the handset on-demand over-the-air. The bytecode program performs the required diagnostic tests and sends the results back over-the-air to a diagnostics server.

The bytecode may optionally be encrypted or digitally-signed to safeguard its integrity and authenticity. The preferred protocol for the transport of a bytecode diagnostic program to the handset is TCP/IP. Alternatively, it is conceivable that a short messaging service (SMS) protocol or a data-burst protocol may be used as transports. Java may be used as a de-facto standard for a choice of bytecode language, since it has almost universal acceptance as a write-once, run anywhere language.

The present invention significantly reduces the cost of supporting a wireless handset after it is sold to a subscriber. A handset according to the principles of the present invention does not require have a built-in algorithm or method for doing diagnostics. The interpreted bytecode provides the benefit of a write-once, run-anywhere application, thereby reducing development and maintenance costs of diagnostic software. Additionally, the diagnostic program is transient and consumes no memory or resources after the diagnostic operations are performed. The diagnostic program is downloaded to the handset only on demand and is discarded upon completion. Hence, the diagnostic program does not permanently take up any extra memory on the handset.

Advantageously, the present invention reduces the possibility of a diagnostic program corrupting existing handset software. Also, the diagnostic software can be written after the handsets are shipped. Since bytecode is platform independent, the same diagnostic program (written in a high-level language) can be written to cover multiple wireless technologies and multiple handset models, vendors and types.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
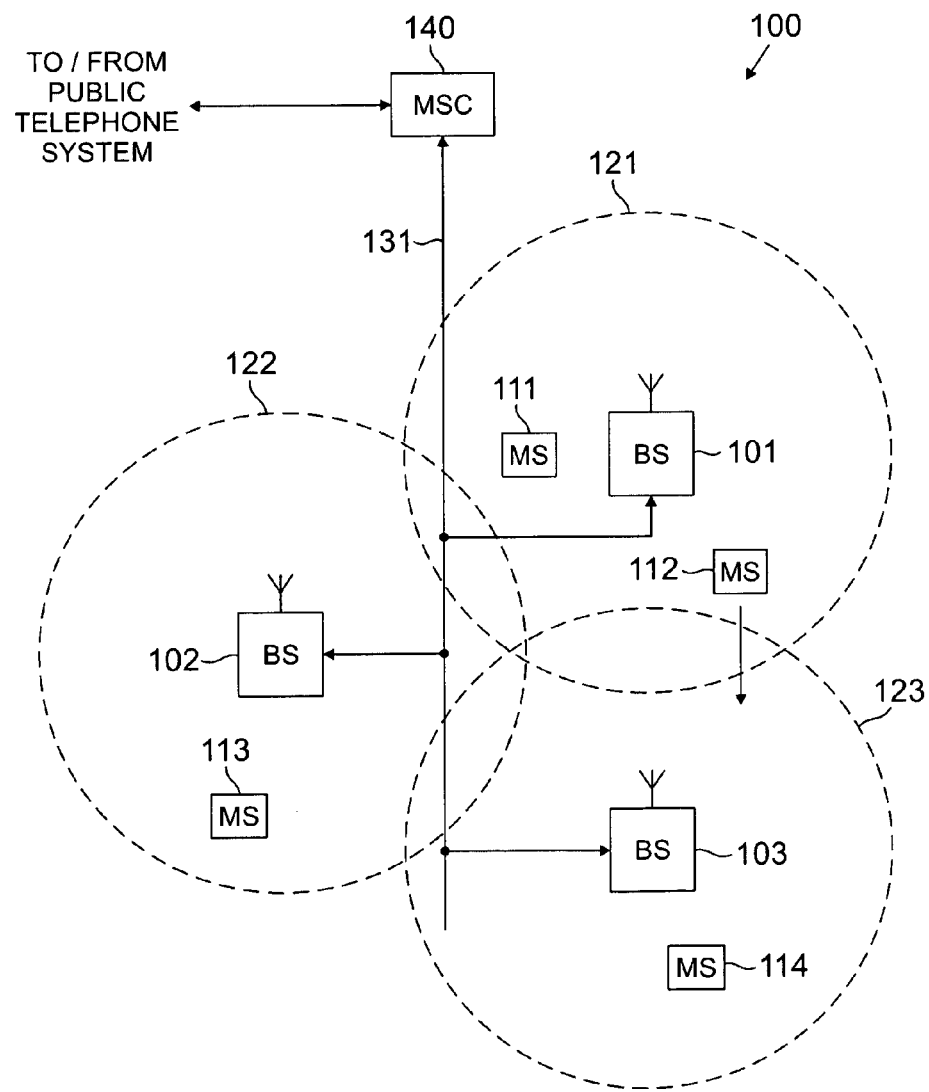
FIG. 1 illustrates a general overview of an exemplary wireless network according to one embodiment of the present invention.

FIG. 1 illustrates a general overview of an exemplary wireless network 100 according to one embodiment of the present invention. Wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communication line 131 may be any suitable connection line, including a T1 line, a T3 line, a fiber optic link, a network backbone connection, and the like. In some embodiments of the present invention, communication line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
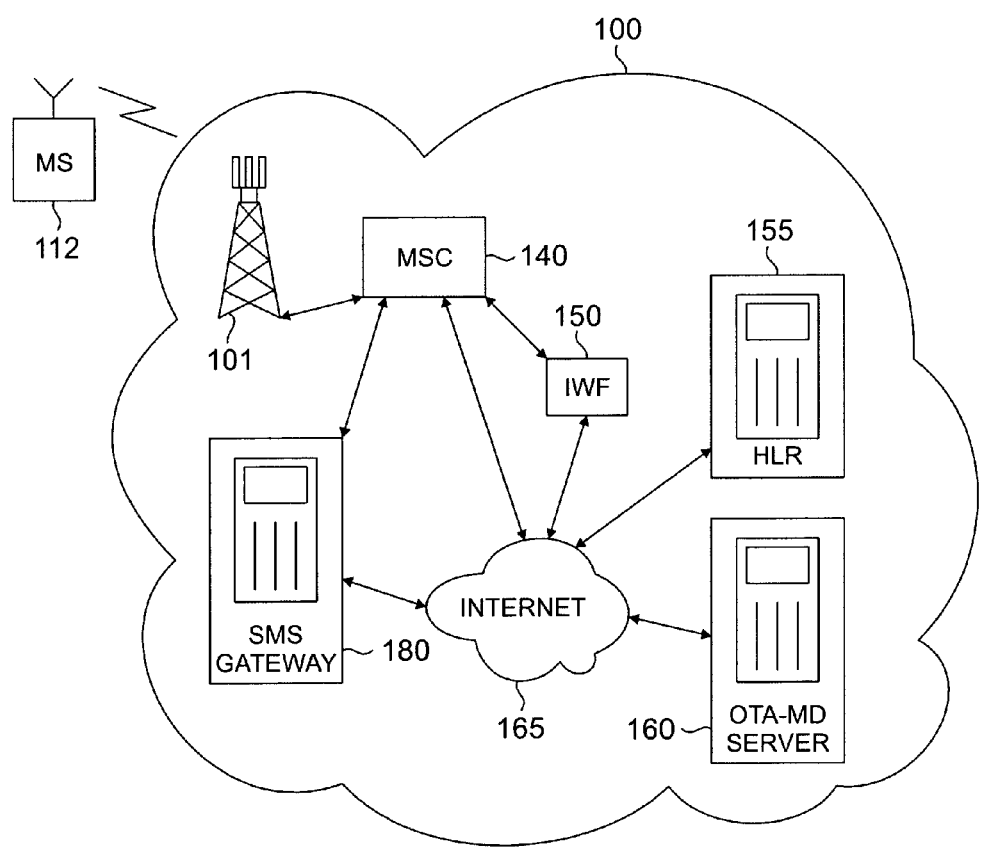
FIG. 2 illustrates an alternate view of selected portions of the exemplary wireless network 100 perform over-the-air (OTA) mobile diagnostic testing according to one embodiment of the present invention.

FIG. 2 illustrates an alternate view of selected portions of exemplary wireless network 100 that perform over-the-air (OTA) mobile diagnostic testing according to one embodiment of the present invention. MS 112, BS 101, and MSC 140 are again shown, as in FIG. 1. In FIG. 2, wireless network 100 further comprises interworking function (IWF) 150, home location register (HLR) 155, over-the-air mobile diagnostic (OTAMD) server 160, and short messaging service (SMS) gateway server 180. Over-the-air mobile diagnostic (OTAMD) server 160 and SMS gateway server 180 are system-wide central servers that may be located remote from the other components of wireless network 100, namely, BS 101, MSC 140, IWF 150, and HLR 155. HLR 155 is a permanent database used by a wireless service provider to identify or verify a subscriber and to store individual subscriber data related to features and services. The wireless service provider for a subscriber uses data in HLR 155 when the subscriber is accessing the wireless network in the subscriber's home coverage area. Other wireless service providers also may use HLR 155 data (typically accessed via wireline telephone networks) when the subscriber roams outside his or her home coverage area.

In order to access a special mobile diagnostic testing file in OTAMD server 160, MSC 140 communicates with OTAMD server 160 via intranet/Internet 165 (hereafter, "Internet 165"). Since data in wireless network 100 may be communicated in one or more of a variety of communication protocols, according to the choices made by the wireless provider, IWF 150 is needed to translate the native communication transport protocol that carries application data in wireless network 100 into Internet protocol (IP) based data packets suitable for transmission in Internet 165.

It should be noted that the scope of the present invention is not limited to wireless networks that use the Internet to link base stations and mobile diagnostic testing servers. In alternate embodiments of the present invention, Internet 165 may actually be a large intranet that links a group of base stations to one or more mobile diagnostic testing servers.

Wireless network 100 allows a subscriber device, such as MS 112, to initiate the mobile diagnostic testing process in any one of a number of ways. In one embodiment of the present invention, after a malfunction occurs, the subscriber using MS 112 may initiate a voice call to OTAMD server 160 by dialing a special diagnostic services phone number. This number may be set up as a speed-dial button on MS 112.

In an advantageous embodiment, the present invention allows the special mobile diagnostics file to be transmitted (i.e., downloaded) to MS 112 by means of a special "data burst" message that occurs in the forward and/or reverse traffic channels that provide communication between MS 112 and BS 101. In such an embodiment, MS 112 only communicates with wireless network 100 via conventional traffic (e.g., voice) channels. Alternatively, the special mobile diagnostics file may be downloaded to MS 112 by means of a Short Messaging Service (SMS) message transmitted from SMS gateway server 180 via BS 101. BS 101 (and/or MSC 140) acts as an agent for MS 112 and independently establishes and controls the Internet session with OTAMD server 160.

In an alternate embodiment of the present invention, MS 112 may be connected directly to OTAMD server 160 by means of a "data" call if wireless network 100 determines that MS 112 is not functioning properly. By data call, it is meant that BS 101 establishes a conventional Internet connection to OTAMD server 160 and transmits and receives Internet protocol (IP) data packets via Internet 165. In such an embodiment, OTAMD server 160 automatically transfers the special mobile diagnostics file to BS 101 for subsequent transmission to MS 112.

Figure 3:
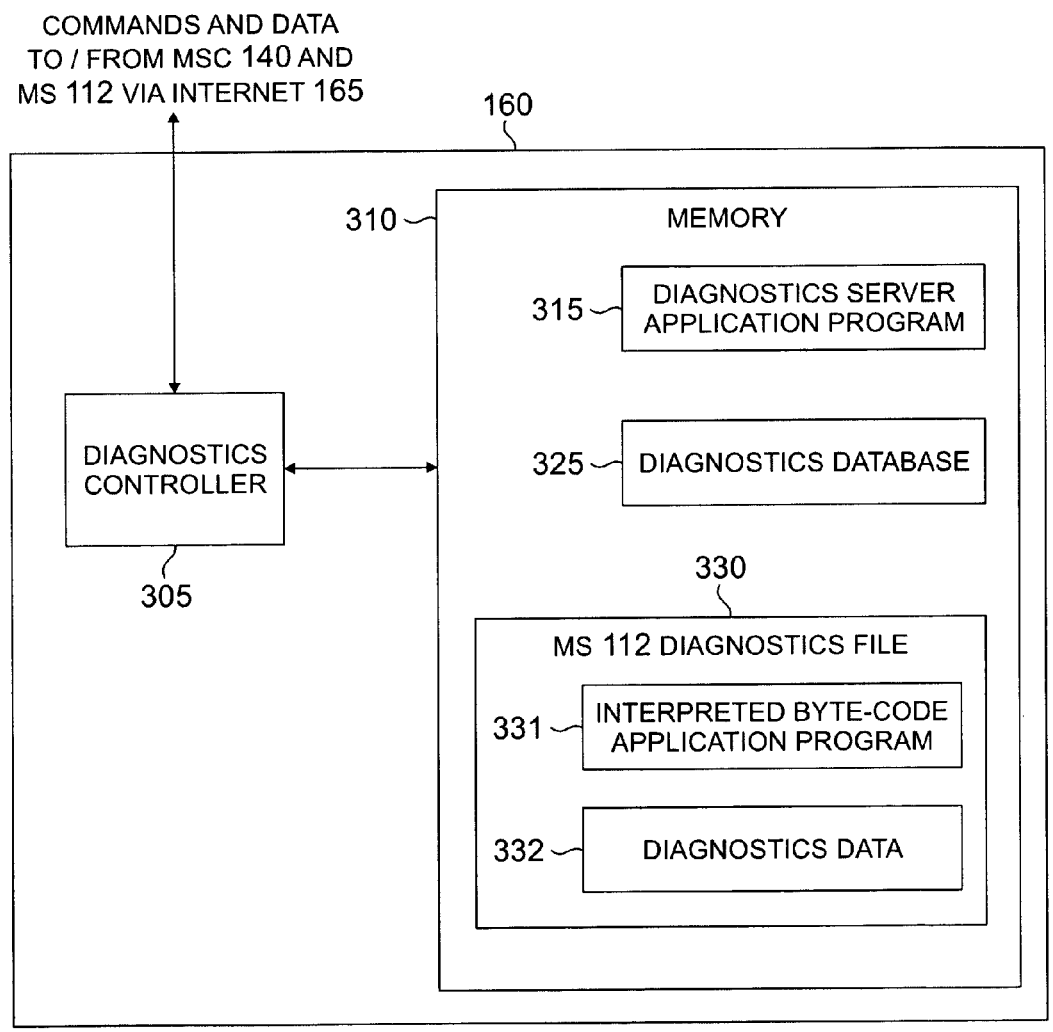
FIG. 3 illustrates an over-the-air mobile diagnostics server according to one embodiment of the present invention.

FIG. 3 illustrates OTAMD server 160 according to one embodiment of the present invention. OTAMD server 160 comprises diagnostics controller 305 and memory 310. Memory 310 stores application programs and data associated with the operation of OTAMD server 160, including diagnostics server application program 315, mobile station (MS) diagnostics database 325, and MS 112 diagnostics file 330. MS 112 diagnostics file 330 comprises interpreted byte-code application program file 331 and diagnostics data file 332.

Diagnostics controller 305 operates under the control of diagnostics server application program 315 to provide diagnostic services for wireless network 100. Diagnostics controller 305 creates MS 112 diagnostics file 330 in response to a diagnostic testing request for MS 112. Diagnostics controller 305 provides a copy of an interpreted byte-code application program to each mobile station being tested, including MS 112. The interpreted byte-code application program is an architecture-neutral (i.e., processor independent) program that may be run on any type of processor used by any handset that includes a byte-code interpreter, such as MS 112. The interpreted byte-code application program may be developed in one of several interpreted byte-code languages including Java, perl, Tcl, Python, and Lisp.

Diagnostics controller 305 stores a copy of the interpreted byte-code application program for MS 112 in interpreted byte-code application program file 331. Diagnostics controller 305 copies diagnostic data and test parameters for MS 112 from MS diagnostic database 325 into diagnostics data file 332. Diagnostics controller 305 transfers the completed MS 112 diagnostics file 330 to wireless network 100 through Internet 165.

Figure 4:
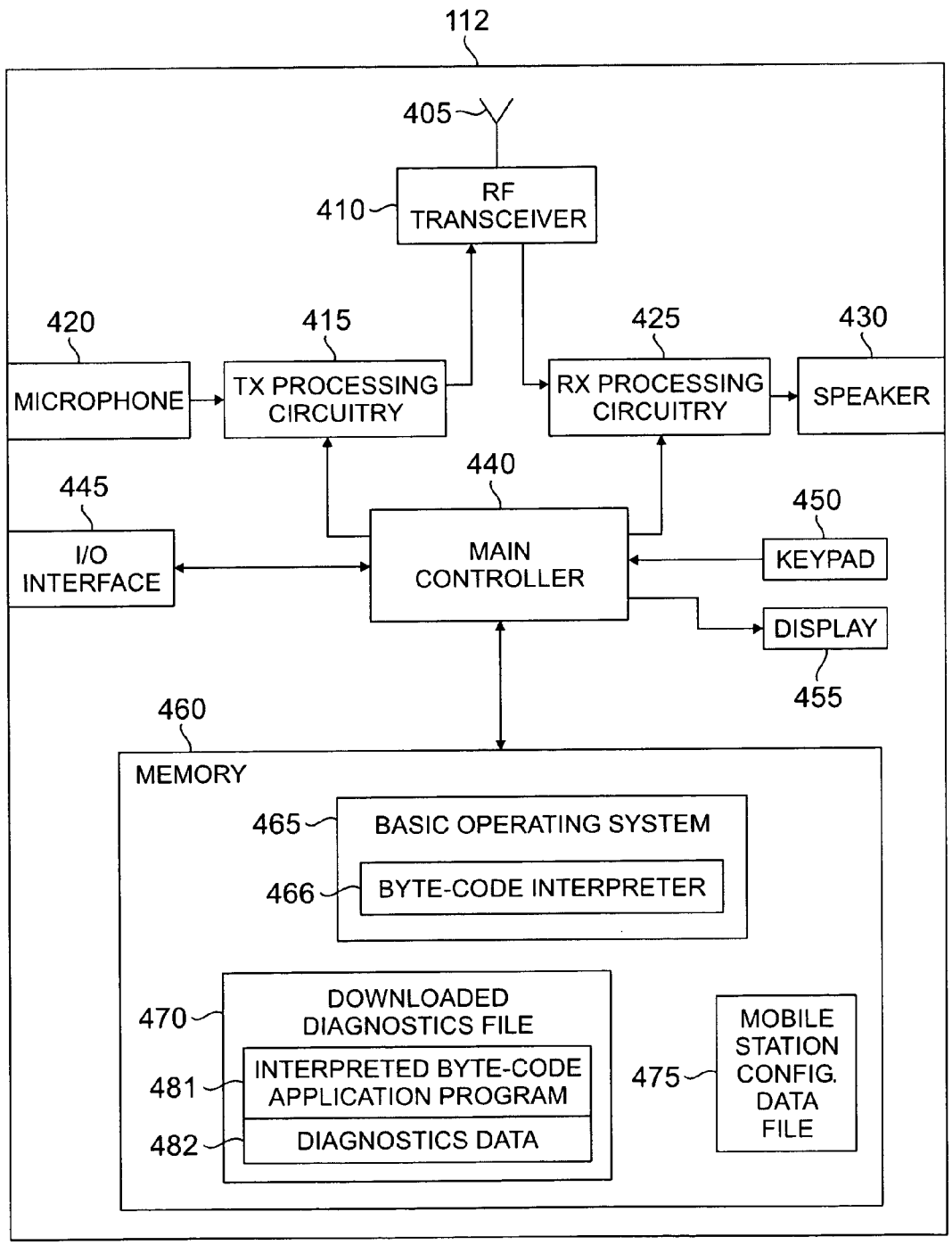
FIG. 4 illustrates an exemplary mobile station according to one embodiment of the present invention.

FIG. 4 illustrates exemplary mobile station 112 according to one embodiment of the present invention. Mobile station 112 comprises antenna 405, radio frequency (RF) transceiver 410, transmitter (TX) processing circuitry 415, microphone 420, receiver (RX) processing circuitry 425, and speaker 430. Mobile station 112 further comprises main controller 440, input/output (I/O) interface 445, keypad 450, display 455, and memory 460.

Antenna 405 transfers wireless communication signals between wireless network 100 and RF transceiver 410. RF transceiver 410 receives and demodulates incoming RF signals transmitted by wireless network 100 and transfers the demodulated voice and/or data traffic to RX processing circuitry 425. RF transceiver 410 also modulates and transmits outgoing voice and/or data traffic received from TX processing circuit 415.

TX processing circuitry 415 receives voice signals from microphone 420 and processes the voice signals prior to transmission by RF transceiver 410. TX processing circuitry 415 may also receive and process data, such as keystroke entries from keypad 450 (via main controller 440) for subsequent transmission by RF transceiver 410. RX processing circuitry 425 receives voice traffic from RF transceiver 410 and converts the voice traffic to analog signals that drive speaker 430. RX processing circuitry 425 may also transfer incoming data traffic to main controller 440.

Main controller 440 executes basic operating system program 465 in order to control the operation of TX processing circuitry 415, RX processing circuitry 425, and the other components of mobile station 112. Main controller 440 also processes incoming data from keypad 450, outgoing data for display 455, and data that is loaded from I/O interface 445. I/O interface 445 typically comprises a connector and interface circuitry that connect an external data source, such as a computer, to main controller 440. I/O interface 445 allows main controller 440 to upload data and store it in memory 460.

Keypad 450 comprises control keys and alphanumeric keys that allow a user to select functions, enter data, and dial numbers. The control keys on keypad 450 may be used to sequence through various menu screens that may appear on display 455. Display 455 may display a limited set of alphanumeric characters or may be capable of displaying a wide array of dynamic and/or static graphics. Display 455 is active when the handset is powered on and may normally show the logo of the service provider during the time that power is turned on.

Memory 460 stores application programs and data associated with the operation of mobile station 112, including basic operating system program 465, which includes byte-code interpreter 466. Byte-code interpreter 466 converts byte-codes generated by a bytecode language, such as Java, to binary operational codes which may be executed as a program by main controller 440. Memory 460 also stores downloaded diagnostics file 470 and mobile station configuration data file 475. Downloaded diagnostics file 470 comprises interpreted byte-code application program 481 and diagnostics data file 482. Interpreted byte-code application program 481 is a diagnostic testing program that communicates with diagnostics server application program 315 and tests the data in mobile station configuration data file 475 and the operation of MS 112 using the contents of diagnostics data file 482. Main controller 440 uses byte-code interpreter 466 to translate interpreted byte-code application program 481 from byte-code to the native machine language of the processor in MS 112. Diagnostics data file 482 contains the same specific diagnostic data and test parameters for MS 112 that is stored in diagnostics data file 332.

During the diagnostic testing process, main controller 440, under the control of basic operating system 465, stores reverse channel data from OTAMD server 160 in downloaded diagnostics file 470. Main controller 440 transmits data and command messages to, and receives data and command messages from, OTAMD server 160 until the contents of MS 112 diagnostics file 330 have been successfully transferred to downloaded diagnostics file 470.

Main controller 440 then uses byte-code interpreter 466 to execute interpreted byte-code application program 481. Main controller 440 may execute a user-friendly graphical user interface (GUI) provided by interpreted byte-code application program 481. If human intervention is necessary, the GUI program guides the subscriber through the diagnostic testing process for MS 112.

Figure 5:
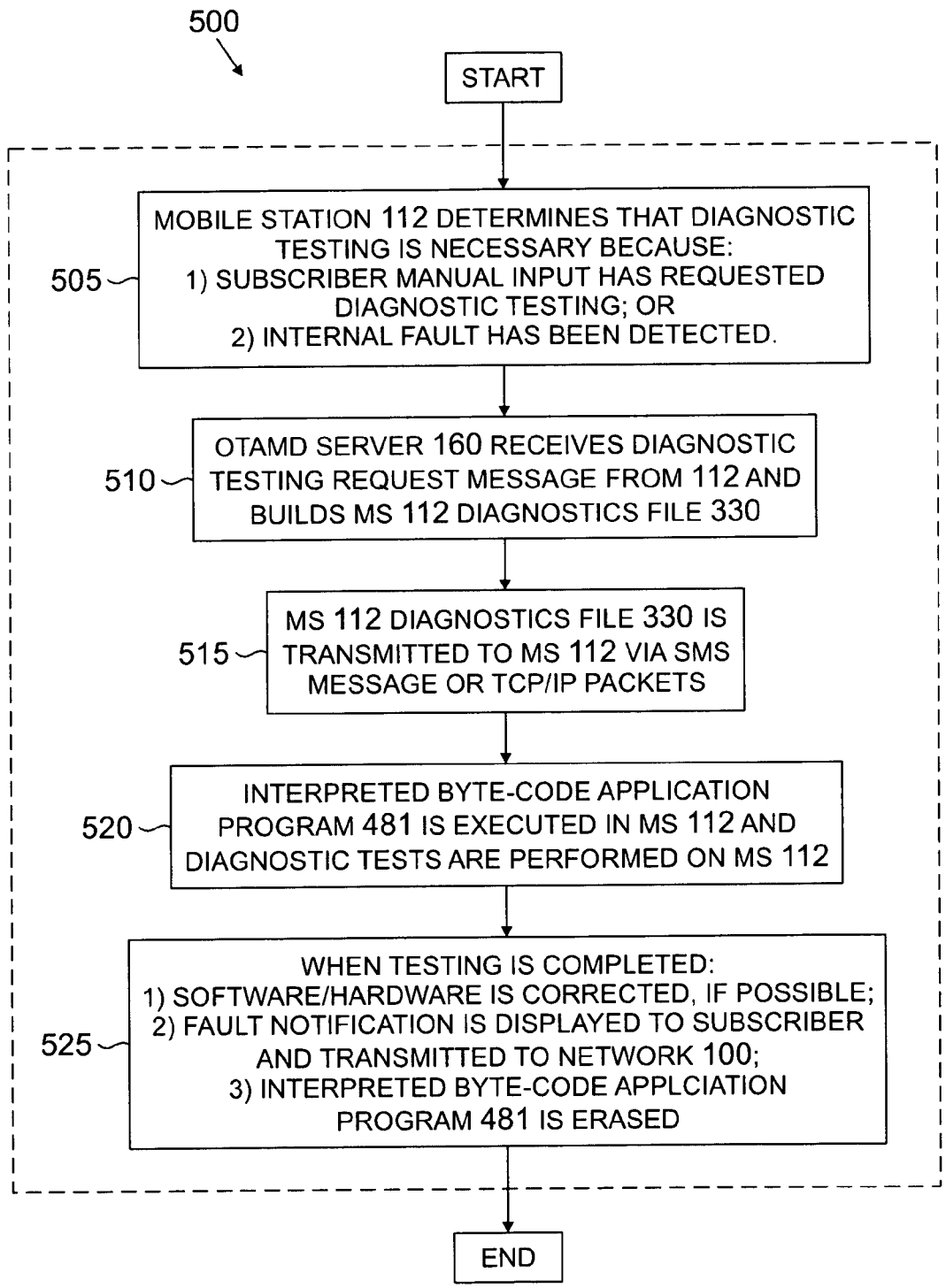
FIG. 5 is a flowchart illustrating the operation of the exemplary OTAMD server and the exemplary mobile station in the wireless network according to one embodiment of the present invention.

FIG. 5 depicts flowchart 500, which illustrates the operation of exemplary OTAMD server 160 and exemplary MS 112 in wireless network 100 according to one embodiment of the present invention. Under normal operating conditions, MS 112 may determine that diagnostic testing is necessary in a number of different ways. In one embodiment, the subscriber using MS 112 may notice something wrong in the operation of MS 112 and may request diagnostic testing. The subscriber may do this by selecting a diagnostic testing option in a menu display on MS 112. Alternatively, the subscriber may dial a default telephone number or access a diagnostic testing web site (i.e., OTAMD server 160) hosted by the wireless service provider. In another embodiment, fault detection operations performed by basic operating system 465 may detect an internal fault in MS 112 (process step 505).

OTAMD server 160 receives the diagnostic testing request message from MS 112 and builds MS 112 diagnostics testing file 330. OTAMD server 160 uses manufacturer and model identification information included in the diagnostic testing request message transmitted by MS 112 to determine the correct interpreted bytecode application program 331 and diagnostics data file 332 to include in MS 112 diagnostics testing file 330 (process step 510). Next, MS 112 diagnostics testing file 330 is transmitted to MS 112 as TCP/IP packets via Internet 165 or as a SMS message via SMS gateway 180 (process step 515).

Next, MS 112 receives the contents of MS 112 diagnostics file 330 and stores it in downloaded service diagnostics file 470. Under the control of byte-code interpreter 466, main controller 440 executes interpreted byte-code application program 481 for data conversion and completion of the diagnostic testing process (process step 520). When the testing process is completed, main controller 440 corrects, if possible, the software or hardware defect that caused the original problem. If correction is not possible, main controller 440 may display a fault notification message on the screen of MS 112 and may transmit the fault notification message to wireless network 100. Finally, main controller 440 erases interpreted byte-code application program 481 in order to free up the address space in memory 112 (process step 525).

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations, each of said base stations capable of communicating with a plurality of mobile stations, a mobile station diagnostic testing system capable of testing the operation of a first one of said plurality of mobile stations comprising:
 a database capable of storing a mobile station diagnostic testing file comprising a mobile station diagnostic testing program in interpreted byte-code format; and
 a diagnostics controller coupled to said database capable of receiving a notification indicating that a fault has occurred in said first mobile station and further capable, in response to receipt of said notification, of retrieving said mobile station diagnostic testing file from said database and transmitting said mobile station diagnostic testing file to said first mobile station, wherein receipt of said mobile station diagnostic testing file causes said mobile station to execute said mobile station diagnostic testing program in said mobile station diagnostic testing file.

2. The mobile station diagnostic testing system as set forth in claim 1 wherein said mobile station diagnostic testing file further comprises diagnostics data used to test said first mobile station.

3. The mobile station diagnostic testing system as set forth in claim 1 wherein said mobile station diagnostic testing file is transmitted to said mobile station using TCP/IP packets.

4. The mobile station diagnostic testing system as set forth in claim 1 wherein said mobile station diagnostic testing file is transmitted to said mobile station using at least one short messaging service (SMS) message.

5. The mobile station diagnostic testing system as set forth in claim 1 wherein said diagnostics controller is capable of determining from said notification a model type of said first mobile station and, in response to said determination, selecting said mobile station diagnostic testing program according to said model type.

6. A mobile station capable of being tested from a wireless network by an over-the-air (OTA) mobile diagnostic testing process, said mobile station comprising:
   an RF transceiver capable of receiving and demodulating forward channel messages from said wireless network and further capable of modulating and transmitting reverse channel messages to said wireless network; and
   a main controller capable of receiving said demodulated forward channel messages from said RF transceiver and extracting therefrom a mobile station diagnostic testing file containing a mobile station diagnostic testing program in interpreted byte-code format, wherein said main controller, in response to receipt of said mobile station diagnostic testing file, is capable of interpreting and executing said mobile station diagnostic testing program.

7. The mobile station as set forth in claim 6 wherein said mobile station diagnostic testing file further comprises diagnostic testing data and wherein said main controller uses said diagnostic testing data to test said mobile station.

8. The mobile station as set forth in claim 6 wherein said mobile station diagnostic testing file is transmitted to said mobile station in said forward channel messages using TCP/IP packets.

9. The mobile station set forth in claim 6 wherein said mobile station diagnostic testing file is transmitted to said mobile station in said forward channel messages using at least one short messaging service (SMS) message.

10. The mobile station as set forth in claim 6 wherein said mobile station diagnostic testing program comprises a graphical user interface (GUi) program capable of interacting with a user of said first mobile station during said OTA diagnostic testing process.

11. The mobile station as set forth in claim 6 wherein said main controller is capable of transmitting to said wireless network a reverse channel notification message notifying said wireless network that a fault has been detected in said mobile station, wherein receipt of said reverse channel notification message is capable of causing said wireless network to transmit said mobile station diagnostic testing file to said mobile station.

12. The mobile station as set forth in claim 11 wherein said reverse channel notification message comprises an identifier identifying a model type of said mobile station.

13. For use in a wireless network comprising a plurality of base stations, each of the base stations capable of communicating with a plurality of mobile stations, a method of testing the operation of a first one of the plurality of mobile stations comprising the steps of:
   storing in a database a mobile station diagnostic testing file comprising a mobile station diagnostic testing program in interpreted byte-code format;
   receiving a notification indicating that a fault has occurred in the first mobile station and further capable;
   in response to receipt of the notification, retrieving the mobile station diagnostic testing file from the database;
   transmitting the mobile station diagnostic testing file to the first mobile station; and
   in response to receipt of the mobile station diagnostic testing file in the mobile station, executing in the mobile station the mobile station diagnostic testing program in the mobile station diagnostic testing file.

14. The method as set forth in claim 13 wherein the mobile station diagnostic testing file further comprises diagnostics data used to test the first mobile station.

15. The method as set forth in claim 13 wherein the step of transmitting comprises the sub-step of transmitting the mobile station diagnostic testing file to the mobile station using TCP/IP packets.

16. The method as set forth in claim 13 wherein the step of transmitting comprises the sub-step of transmitting the mobile station diagnostic testing file to the mobile station using at least one short messaging service (SMS) message.

17. The method as set forth in claim 13 further comprising the step of determining from the notification a model type of the first mobile station and, in response to the determination, selecting the mobile station diagnostic testing program according to the model type.

18. For use in a mobile station capable of communicating with a wireless network, a method of performing an over-the-air diagnostic testing of the mobile station from the wireless network comprising the steps of:
   receiving and demodulating forward channel messages from the wireless network;
   extracting from the demodulated forward channel messages a mobile station diagnostic testing file containing a mobile station diagnostic testing program in interpreted byte-code format;
   interpreting and executing the mobile station diagnostic testing program;
   transmitting to the wireless network a reverse channel notification message notifying the wireless network that a fault has been detected in the mobile station; and
   in response to receipt of the reverse channel notification message transmitting the mobile station diagnostic testing file to the mobile station from the wireless network.

19. The method as set forth in claim 18 wherein the mobile station diagnostic testing file further comprises diagnostic testing data used to test the mobile station.

20. The method as set forth in claim 18 wherein the forward channel messages comprise TCP/IP packets.

21. The method as set forth in claim 18 wherein the forward channel messages comprise at least one short messaging service (SMS) message.

22. The method as set forth in claim 18 wherein the mobile station diagnostic testing program comprises a graphical user interface (GUI) program capable of interacting with a user of the mobile station during the OTA diagnostic testing process.

23. The method as set forth in claim 18 wherein the reverse channel notification message comprises an identifier identifying a model type of the mobile station.

* * * * *